US008711170B2

(12) United States Patent
Bratt et al.

(10) Patent No.: US 8,711,170 B2
(45) Date of Patent: Apr. 29, 2014

(54) EDGE ALPHAS FOR IMAGE TRANSLATION

(75) Inventors: Joseph P. Bratt, San Jose, CA (US);
Peter F. Holland, Sunnyvale, CA (US);
Gokhan Avkarogullari, San Jose, CA (US)

(73) Assignee: Apple Inc., Cupertino, CA (US)

( * ) Notice: Subject to any disclaimer, the term of this patent is extended or adjusted under 35 U.S.C. 154(b) by 598 days.

(21) Appl. No.: 13/026,559

(22) Filed: Feb. 14, 2011

(65) Prior Publication Data

US 2012/0206468 A1     Aug. 16, 2012

(51) Int. Cl.
*G09G 5/02*     (2006.01)

(52) U.S. Cl.
USPC ........... 345/592; 345/606; 345/611; 345/613; 345/672; 345/682; 345/684; 382/260; 382/266; 382/269

(58) Field of Classification Search
None
See application file for complete search history.

(56) References Cited

U.S. PATENT DOCUMENTS

| | | | |
|---|---|---|---|
| 6,784,897 B2 | 8/2004 | I | |
| 6,900,817 B2 * | 5/2005 | Uesugi | 345/619 |
| 7,274,377 B2 * | 9/2007 | Ivashin et al. | 345/619 |
| 7,300,192 B2 | 11/2007 | Mueller et al. | |
| 2008/0089608 A1 | 4/2008 | Phillips | |
| 2010/0060798 A1 * | 3/2010 | Sato et al. | 348/699 |
| 2010/0079480 A1 | 4/2010 | Murtagh | |

OTHER PUBLICATIONS

International Search Report and Written Opinion in application No. PCT/US2012/021745 mailed May 15, 2012.
Anonymous: "Motion 4 User Manual: Using Masks to Create Transparency", A Motion 4 User Manual, Dec. 31, 2009, XP002674826, Retrieved from the Internet: URL:http://documentation.apple.com/en/motion/usermanual/index.html#chapter=17%26section=15 [retrieved on Apr. 19, 2012] the whole document, especially the first 3 lines on p. 5.
Carey Bunks : "5.6 The Blending Modes", Aug. 18, 2010, pp. 1-3, XP002674358, Retrieved from the Internet: URL:http://web.archive.org/web/20100818041311/http://www.linuxtopia.org/online_books/graphics_tools/gimp_advanced_guide/gimp_9uide_node55.html . . . [retrieved on Mar. 29, 2012] the whole document.

* cited by examiner

*Primary Examiner* — Antonio A Caschera
(74) *Attorney, Agent, or Firm* — Lawrence J. Merkel; Meyertons, Hood, Kivlin, Kowert & Goetzel, P.C.

(57) ABSTRACT

A video display pipe used for processing pixels of video and/or image frames may include edge Alpha registers for storing edge Alpha values corresponding to the edges of an image to be translated across a display screen. The edge Alpha values may be specified based on the fractional pixel value by which the image is to be moved in the current frame. The video pipe may copy the column and row of pixels that are in the direction of travel, and may apply the edge Alpha values to the copied column and row. The edge Alpha values may control blending of the additional column and row of the translated image with the adjacent pixels in the original frame, providing the effect of the partial pixel movement, simulating a sub-pixel rate of movement.

22 Claims, 8 Drawing Sheets

Width x Height = Destination Frame (Video Window) Region

| Blend Mode | Equation |
|---|---|
| Disabled | Cout[k,i] = Cout[k-1,i] |
| Normal | Cout[k,i] = C[k,i] * ADis[k] * A[k,i] + Cout[k-1,i] * ( 1 – ADis[k] * A[k,i] ) |
| Premultiplied | Cout[k,i] = C[k,i] * ADis[k] + Cout[k-1,i] * ( 1 – ADis[k] * A[k,i] ) |
| Saturate | Cout[k,i] = C[k,i] * ADis[k] * ASat[k] + Cout[k-1,i] * ( 1 – ADis[k] * ASat[k] ) |

| | Description |
|---|---|
| | No layer k blending. Layer k is not used. |
| | Per-pixel Alpha blending with dissolve |
| | Per-pixel premultiplied Alpha blending with dissolve |
| | Override per-pixel Alpha |

| Blend Mode | Alpha for Current Layer AEffCur[i] | Alpha for Previous Layer AEffPrev[i] | Description |
|---|---|---|---|
| Disabled | No Alpha | No Alpha | No layer k blending. Layer k is not used. |
| Normal | ADis[k] * A[k,i] | ADis[k] * A[k,i] | Per-pixel Alpha blending with dissolve |
| Premultiplied | ADis[k] | ADis[k] * A[k,i] | Per-pixel premultiplied Alpha blending with dissolve |
| Saturate | ADis[k] * ASat[k] | ADis[k] * ASat[k] | Override per-pixel Alpha |

EDGE ALPHAS FOR IMAGE TRANSLATION

BACKGROUND

1. Field of the Invention

This invention is related to the field of graphical information processing, more particularly, to moving an image/video frame across the screen.

2. Description of the Related Art

Part of the operation of many computer systems, including portable digital devices such as mobile phones, notebook computers and the like is the use of some type of display device, such as a liquid crystal display (LCD), to display images, video information/streams, and data. Accordingly, these systems typically incorporate functionality for generating images and data, including video information, which are subsequently output to the display device. Such devices typically include video graphics circuitry to process images and video information for subsequent display.

In digital imaging, the smallest item of information in an image is called a "picture element", more generally referred to as a "pixel". For convenience, pixels are generally arranged in a regular two-dimensional grid. By using this arrangement, many common operations can be implemented by uniformly applying the same operation to each pixel independently. Since each pixel is an elemental part of a digital image, a greater number of pixels can provide a more accurate representation of the digital image. The intensity of each pixel can vary, and in color systems each pixel has typically three or four components such as red, green, blue, and black.

Most images and video information displayed on display devices such as LCD screens are interpreted as a succession of image frames, or frames for short. While generally a frame is one of the many still images that make up a complete moving picture or video stream, a frame can also be interpreted more broadly as simply a still image displayed on a digital (discrete, or progressive scan) display. A frame typically consists of a specified number of pixels according to the resolution of the image/video frame. Information associated with a frame typically consists of color values for every pixel to be displayed on the screen. Color values are commonly stored in 1-bit monochrome, 4-bit palletized, 8-bit palletized, 16-bit high color and 24-bit true color formats. An additional alpha channel is oftentimes used to retain information about pixel transparency. The color values can represent information corresponding to any one of a number of color spaces.

In addition to the color values, the pixels may also have associated per-pixel Alpha values providing opacity information for the pixel. Alpha values may be stored what is commonly referred to as an Alpha channel, and each Alpha value may be between 0 and 1, with a value of 0 meaning that the pixel does not have any coverage information and is transparent, and a value of 1 meaning that the pixel is opaque. Based on this opacity information, various layers of an image frame may be blended together. In general, blending is the process of combining multiple layers of an image to overlay portion of one layer atop another layer, or to create the appearance of partial transparency of certain elements in some of the layers. For example, blending is used extensively when combining computer rendered image elements with live footage. In some cases an image is to be translated (moved) across the screen. The image may be a still image or it may represent the contents of a video frame. The blended result will therefore represent the motion of the image. Based on the speed at which the image is moving and the number of frames per second that are being displayed, a number of pixels of movement in both the vertical and horizontal directions can be calculated. That is, the rate of movement can be referenced back to pixels. Typically, the number of pixels of movement is not an integer, indicating a sub pixel rate of movement, (or fractional pixel movement). However, when the number (of pixels of movement) is rounded to the nearest integer and compensated with an extra pixel movement in certain frames, the translation is not as smooth as desired.

Other corresponding issues related to the prior art will become apparent to one skilled in the art after comparing such prior art with the present invention as described herein.

SUMMARY

A blend unit in a display pipe for processing pixels of video and/or image frames may include multiple blend stages for blending pixels for multiple layers. For example, multiple (two, three, or more) layers may be blended two layers at a time, each blend stage performing a blend operation on two layers, with the output of any given blend stage providing the input to the next blend stage, through to a final blend stage. A blend equation used for blending within each blend stage may be a multi-step equation that involves multiple blend levels. Within each given blend stage, the Alpha values and color values of the current layer, and the color results representative of a previously blended layer (beginning with a background layer) may all be combined to obtain an output value for a given pixel position in the combined layers. Blending may be performed using multiple types of Alpha values. For example, individual pixels may each have a corresponding per-pixel Alpha value, individual frames may each have a static per-frame Alpha value, and individual frames may each have a static per-frame combining Alpha value, otherwise referred to as a per-frame dissolve Alpha value. In some embodiments, the per-pixel Alpha value may be pre-multiplied with the color value.

In one set of embodiments, an additional type of Alpha value designated as an edge Alpha value may also be used during blending. In some cases, an image may be translated (moved) across the screen. Based on the speed at which the image is moving and the number of frames that are being displayed per second, a number of pixels of movement in both the vertical and horizontal directions may be calculated. That is, the rate of movement may be referenced back to pixels. The number of pixels of movement may not be an integer, indicating a sub pixel rate of movement, (or fractional pixel movement). If the number (of pixels of movement) were rounded to the nearest integer and compensated with an extra pixel movement in certain frames, the translation across the screen may not appear as smooth as desired. A display pipe used for processing pixels of video and/or image frames may therefore include one or more registers to store edge Alpha values associated with the edges of an image that is to be translated. The image may be a still image, or it may represent the contents of a video frame. The edge Alpha values may be set based on the fractional pixel by which the image is being moved in the display frame. The display pipe may copy the column and row of pixels that are in the direction of travel, and apply the edge Alpha values to this additional column and row. The edge Alpha values may control blending of the additional column and row of the image with the adjacent pixels in the display frame, providing the effect of the partial pixel movement, simulating a sub pixel rate movement.

In one set of embodiments, a video pipe may include one or more registers programmable with an edge Alpha value to be applied to an edge of an image, where the image is to be translated across an image frame in a specified direction of travel, and the edge is perpendicular to the specified direction of travel. The video pipe may also include a control unit coupled to the one or more registers to supply pixels and corresponding Alpha values of the image to a blend unit, detect the edge of the image, and supply the edge Alpha value from the one or more registers along with pixels forming the edge of the image to the blend unit to be blended with corresponding pixels of the image frame. The edge Alpha value may be specified based on a fractional pixel value by which the image is to be translated across the image frame. Furthermore, the edge Alpha value may be a fractional value of each of the corresponding Alpha values. In other words, the edge Alpha value may be a fractional value of any Alpha value corresponding to image pixels that are not pixels forming the edge of the image. The corresponding pixels of the image frame may be adjacent to the pixels forming the edge of the image.

In another set of embodiments, a display pipe may include a fetch unit to fetch image pixels from a source buffer. The image pixels may form an image to be translated across an image frame in a specified direction of travel, with the image pixels including edge pixels forming edges of the image, and also including interior pixels representing the remaining image pixels that are not edge pixels. The fetch unit may also fetch an Alpha value corresponding to the interior pixels. The display pipe may further include a register programmable with edge Alpha values associated with the edge pixels, and may also include a control unit to identify the edge pixels, supply the interior pixels and the Alpha value to a blend unit to be blended with pixels of the image frame, and supply the edge pixels and the edge Alpha values to the blend unit to be blended with corresponding pixels of the image frame. The display pipe may include one or more user interface units to fetch pixels forming one or more additional images, and also fetch respective Alpha values corresponding to the pixels. The user interface units may supply the pixels and the respective Alpha values to the blend unit to be blended with the pixels of the image frame, the interior pixels, the Alpha value, the edge pixels, and the edge Alpha values. The image formed by the image pixels may represent the frame of a video stream. The edge pixels may include edge pixels forming a first edge of the image, and edge pixels forming a second edge of the image, with the first edge and the second edge perpendicular to the specified direction of travel. Correspondingly, the edge Alpha values may include a first edge Alpha value associated with the edge pixels that form the first edge of the image, and a second edge Alpha value associated with the edge pixels that form the second edge of the image, with a sum of the first Alpha value and the second Alpha value representing an Alpha value corresponding to 100% opacity.

In one embodiment, a system includes a video buffer to store video information represented by video pixels, and corresponding to a video frame to be translated across a display frame in a specified direction of travel at a specified rate of translation. The video pixels include edge pixels representing video information along the edges of the video frame. The system also includes a frame buffer to store image information represented by image pixels, and further includes a display pipe that includes at least one register to store edge Alpha values associated with the edge pixels. The specified rate of translation may correspond to a number of pixels of movement in vertical and horizontal directions, and the Alpha values may be specified according to the number of pixels of movement. The display pipe fetches the video pixels from the video buffer and the image pixels from the frame buffer, and blends the edge Alpha values with the fetched edge pixels to produce blended edge pixels. The display pipe then blends the fetched video pixels, which include the blended edge pixels, with the fetched image pixels to produce blended pixels. The system further includes a display controller to receive the blended pixels and provide the blended pixels to be displayed on a display screen.

BRIEF DESCRIPTION OF THE DRAWINGS

The following detailed description makes reference to the accompanying drawings, which are now briefly described.

FIG. 4 shows a table of the blend equations for different possible blending modes, according to one embodiment.

FIG. 5 shows a table of the respective calculations of effective Alpha values for different possible blending modes, according to one embodiment.

Figure 1:
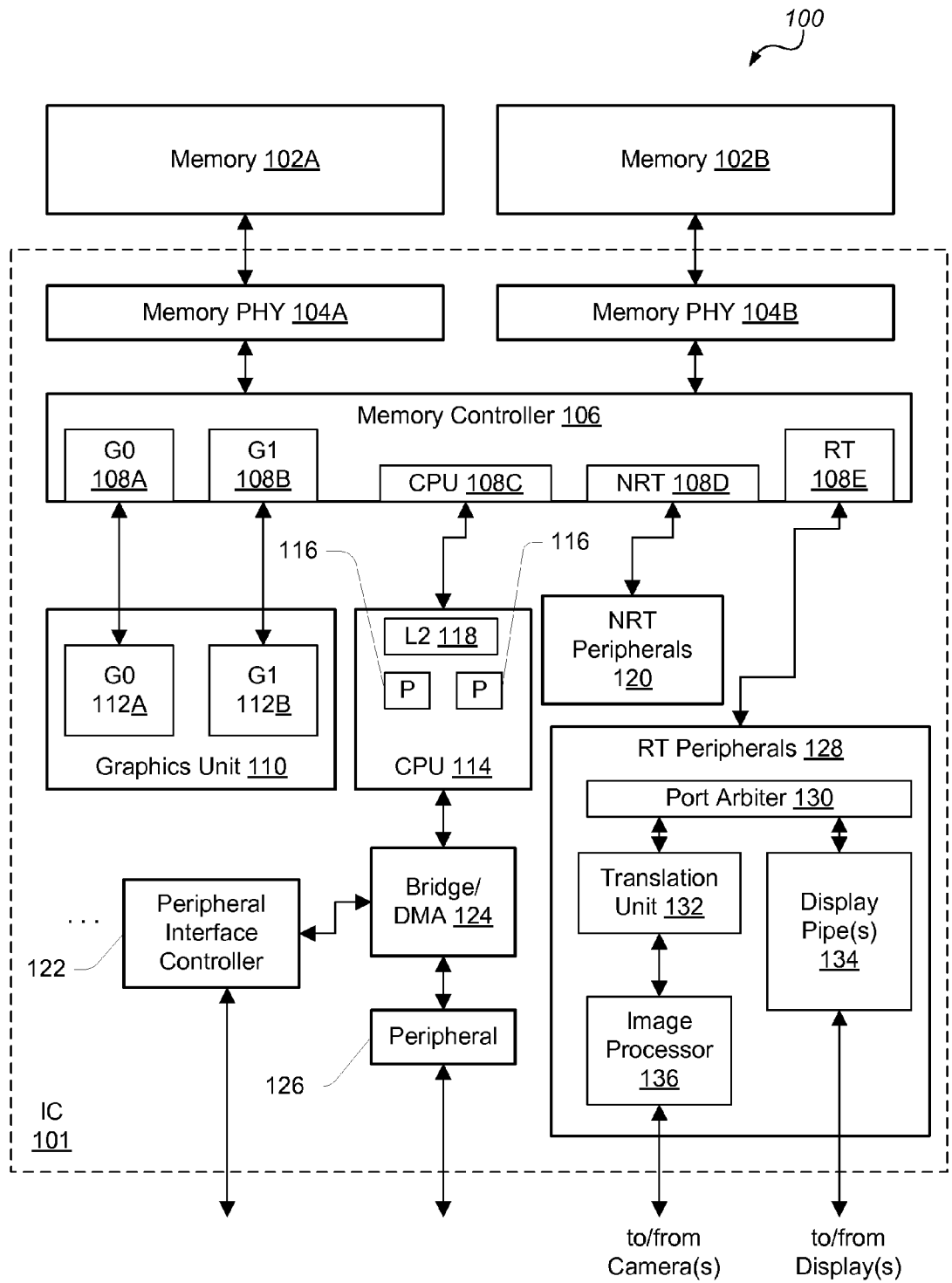
FIG. 1 is a block diagram of one embodiment of an integrated circuit that include a graphics display system.

While the invention is susceptible to various modifications and alternative forms, specific embodiments thereof are shown by way of example in the drawings and will herein be described in detail. It should be understood, however, that the drawings and detailed description thereto are not intended to limit the invention to the particular form disclosed, but on the contrary, the intention is to cover all modifications, equivalents and alternatives falling within the spirit and scope of the present invention as defined by the appended claims. The headings used herein are for organizational purposes only and are not meant to be used to limit the scope of the description. As used throughout this application, the word "may" is used in a permissive sense (i.e., meaning having the potential to), rather than the mandatory sense (i.e., meaning must). Similarly, the words "include", "including", and "includes" mean including, but not limited to.

Various units, circuits, or other components may be described as "configured to" perform a task or tasks. In such contexts, "configured to" is a broad recitation of structure generally meaning "having circuitry that" performs the task or tasks during operation. As such, the unit/circuit/component can be configured to perform the task even when the unit/circuit/component is not currently on. In general, the circuitry that forms the structure corresponding to "configured to" may include hardware circuits and/or memory storing program instructions executable to implement the operation. The memory can include volatile memory such as static or dynamic random access memory and/or nonvolatile memory such as optical or magnetic disk storage, flash memory, programmable read-only memories, etc. Similarly, various units/circuits/components may be described as performing a task or tasks, for convenience in the description. Such descriptions should be interpreted as including the phrase "configured to."

Reciting a unit/circuit/component that is configured to perform one or more tasks is expressly intended not to invoke 35 U.S.C. §112, paragraph six interpretation for that unit/circuit/component.

DETAILED DESCRIPTION OF EMBODIMENTS

Turning now to FIG. 1, a block diagram of one embodiment of a system 100 is shown. In the embodiment of FIG. 1, system 100 includes an integrated circuit (IC) 101 coupled to external memories 102A-102B. In the illustrated embodiment, IC 101 includes a central processor unit (CPU) block 114, which includes one or more processors 116 and a level 2 (L2) cache 118. Other embodiments may not include L2 cache 118 and/or may include additional levels of cache. Additionally, embodiments that include more than two processors 116 and that include only one processor 116 are contemplated. IC 101 further includes a set of one or more non-real time (NRT) peripherals 120 and a set of one or more real time (RT) peripherals 128. In the illustrated embodiment, RT peripherals 128 include an image processor 136, one or more display pipes 134, a translation unit 132, and a port arbiter 130. Other embodiments may include more processors 136 or fewer image processors 136, more display pipes 134 or fewer display pipes 134, and/or any additional real time peripherals as desired. Image processor 136 may be coupled to receive image data from one or more cameras in system 100. Similarly, display pipes 134 may be coupled to one or more display controllers (not shown) which may control one or more displays in the system. Image processor 136 may be coupled to translation unit 132, which may be further coupled to port arbiter 130, which may be coupled to display pipes 134 as well. In the illustrated embodiment, CPU block 114 is coupled to a bridge/direct memory access (DMA) controller 124, which may be coupled to one or more peripheral devices 126 and/or to one or more peripheral interface controllers 122. The number of peripheral devices 126 and peripheral interface controllers 122 may vary from zero to any desired number in various embodiments. System 100 illustrated in FIG. 1 further includes a graphics unit 110 comprising one or more graphics controllers such as G0 112A and G1 112B. The number of graphics controllers per graphics unit and the number of graphics units may vary in other embodiments. As illustrated in FIG. 1, system 100 includes a memory controller 106 coupled to one or more memory physical interface circuits (PHYs) 104A-104B. The memory PHYs 104A-104B are configured to communicate with memories 102A-102B via pins of IC 101. Memory controller 106 also includes a set of ports 108A-108E. Ports 108A-108B are coupled to graphics controllers 112A-112B, respectively. CPU block 114 is coupled to port 108C. NRT peripherals 120 and RT peripherals 128 are coupled to ports 108D-108E, respectively. The number of ports included in memory controller 106 may be varied in other embodiments, as may the number of memory controllers. In other embodiments, the number of memory physical layers (PHYs) 104A-104B and corresponding memories 102A-102B may be less or more than the two instances shown in FIG. 1.

In one embodiment, each port 108A-108E may be associated with a particular type of traffic. For example, in one embodiment, the traffic types may include RT traffic, Non-RT (NRT) traffic, and graphics traffic. Other embodiments may include other traffic types in addition to, instead of, or in addition to a subset of the above traffic types. Each type of traffic may be characterized differently (e.g. in terms of requirements and behavior), and memory controller 106 may handle the traffic types differently to provide higher performance based on the characteristics. For example, RT traffic requires servicing of each memory operation within a specific amount of time. If the latency of the operation exceeds the specific amount of time, erroneous operation may occur in RT peripherals 128. For example, image data may be lost in image processor 136 or the displayed image on the displays to which display pipes 134 are coupled may visually distort. RT traffic may be characterized as isochronous, for example. On the other hand, graphics traffic may be relatively high bandwidth, but not latency-sensitive. NRT traffic, such as from processors 116, is more latency-sensitive for performance reasons but survives higher latency. That is, NRT traffic may generally be serviced at any latency without causing erroneous operation in the devices generating the NRT traffic. Similarly, the less latency-sensitive but higher bandwidth graphics traffic may be generally serviced at any latency. Other NRT traffic may include audio traffic, which is relatively low bandwidth and generally may be serviced with reasonable latency. Most peripheral traffic may also be NRT (e.g. traffic to storage devices such as magnetic, optical, or solid state storage). By providing ports 108A-108E associated with different traffic types, memory controller 106 may be exposed to the different traffic types in parallel.

As mentioned above, RT peripherals 128 may include image processor 136 and display pipes 134. Display pipes 134 may include circuitry to fetch one or more image frames and to blend the frames to create a display image. Display pipes 134 may further include one or more video pipelines, and video frames may be blended with (relatively) static image frames to create frames for display at the video frame rate. The output of display pipes 134 may be a stream of pixels to be displayed on a display screen. The pixel values may be transmitted to a display controller for display on the display screen. Image processor 136 may receive camera data and process the data to an image to be stored in memory.

Both the display pipes 134 and image processor 136 may operate in virtual address space, and thus may use translations to generate physical addresses for the memory operations to read or write memory. Image processor 136 may have a somewhat random-access memory pattern, and may thus rely on translation unit 132 for translation. Translation unit 132 may employ a translation look-aside buffer (TLB) that caches each translation for a period of time based on how frequently the translation is used with respect to other cached translations. For example, the TLB may employ a set associative or fully associative construction, and a least recently used (LRU)-type algorithm may be used to rank recency of use of the translations among the translations in a set (or across the TLB in fully associative configurations). LRU-type algorithms may include, for example, true LRU, pseudo-LRU, most recently used (MRU), etc. Additionally, a fairly large TLB may be implemented to reduce the effects of capacity misses in the TLB.

The access patterns of display pipes 134, on the other hand, may be fairly regular. For example, image data for each source image may be stored in consecutive memory locations in the virtual address space. Thus, display pipes 134 may begin processing source image data from a virtual page, and subsequent virtual pages may be consecutive to the virtual page. That is, the virtual page numbers may be in numerical order, increasing or decreasing by one from page to page as the image data is fetched. Similarly, the translations may be consecutive to one another in a given page table in memory (e.g. consecutive entries in the page table may translate virtual page numbers that are numerically one greater than or less than each other). While more than one page table may be used in some embodiments, and thus the last entry of the page table may not be consecutive to the first entry of the next page table, most translations may be consecutive in the page tables. Viewed in another way, the virtual pages storing the image data may be adjacent to each other in the virtual address space. That is, there may be no intervening pages between the adjacent virtual pages in the virtual address space.

Display pipes 134 may implement translation units that prefetch translations in advance of the display pipes' reads of image data. The prefetch may be initiated when the processing of a source image is to start, and the translation unit may prefetch enough consecutive translations to fill a translation memory in the translation unit. The fetch circuitry in the display pipes may inform the translation unit as the processing of data in virtual pages is completed, and the translation unit may invalidate the corresponding translation, and prefetch additional translations. Accordingly, once the initial prefetching is complete, the translation for each virtual page may frequently be available in the translation unit as display pipes 134 begin fetching from that virtual page. Additionally, competition for translation unit 132 from display pipes 134 may be eliminated in favor of the prefetching translation units. Since translation units 132 in display pipes 134 fetch translations for a set of contiguous virtual pages, they may be referred to as "streaming translation units."

In general, display pipes 134 may include one or more user interface units that are configured to fetch relatively static frames. That is, the source image in a static frame is not part of a video sequence. While the static frame may be changed, it is not changing according to a video frame rate corresponding to a video sequence. Display pipes 134 may further include one or more video pipelines configured to fetch video frames. These various pipelines (e.g. the user interface units and video pipelines) may be generally referred to as "image processing pipelines."

Returning to the memory controller 106, generally a port may be a communication point on memory controller 106 to communicate with one or more sources. In some cases, the port may be dedicated to a source (e.g. ports 108A-108B may be dedicated to the graphics controllers 112A-112B, respectively). In other cases, the port may be shared among multiple sources (e.g. processors 116 may share CPU port 108C, NRT peripherals 120 may share NRT port 108D, and RT peripherals 128 such as display pipes 134 and image processor 136 may share RT port 108E. A port may be coupled to a single interface to communicate with the one or more sources. Thus, when sources share an interface, there may be an arbiter on the sources' side of the interface to select between the sources. For example, L2 cache 118 may serve as an arbiter for CPU port 108C to memory controller 106. Port arbiter 130 may serve as an arbiter for RT port 108E, and a similar port arbiter (not shown) may be an arbiter for NRT port 108D. The single source on a port or the combination of sources on a port may be referred to as an agent. Each port 108A-108E is coupled to an interface to communicate with its respective agent. The interface may be any type of communication medium (e.g. a bus, a point-to-point interconnect, etc.) and may implement any protocol. In some embodiments, ports 108A-108E may all implement the same interface and protocol. In other embodiments, different ports may implement different interfaces and/or protocols. In still other embodiments, memory controller 106 may be single ported.

In an embodiment, each source may assign a quality of service (QoS) parameter to each memory operation transmitted by that source. The QoS parameter may identify a requested level of service for the memory operation. Memory operations with QoS parameter values requesting higher levels of service may be given preference over memory operations requesting lower levels of service. Each memory operation may include a flow ID (FID). The FID may identify a memory operation as being part of a flow of memory operations. A flow of memory operations may generally be related, whereas memory operations from different flows, even if from the same source, may not be related. A portion of the FID (e.g. a source field) may identify the source, and the remainder of the FID may identify the flow (e.g. a flow field). Thus, an FID may be similar to a transaction ID, and some sources may simply transmit a transaction ID as an FID. In such a case, the source field of the transaction ID may be the source field of the FID and the sequence number (that identifies the transaction among transactions from the same source) of the transaction ID may be the flow field of the FID. In some embodiments, different traffic types may have different definitions of QoS parameters. That is, the different traffic types may have different sets of QoS parameters.

Memory controller 106 may be configured to process the QoS parameters received on each port 108A-108E and may use the relative QoS parameter values to schedule memory operations received on the ports with respect to other memory operations from that port and with respect to other memory operations received on other ports. More specifically, memory controller 106 may be configured to compare QoS parameters that are drawn from different sets of QoS parameters (e.g. RT QoS parameters and NRT QoS parameters) and may be configured to make scheduling decisions based on the QoS parameters.

In some embodiments, memory controller 106 may be configured to upgrade QoS levels for pending memory operations. Various upgrade mechanism may be supported. For example, the memory controller 106 may be configured to upgrade the QoS level for pending memory operations of a flow responsive to receiving another memory operation from the same flow that has a QoS parameter specifying a higher QoS level. This form of QoS upgrade may be referred to as in-band upgrade, since the QoS parameters transmitted using the normal memory operation transmission method also serve as an implicit upgrade request for memory operations in the same flow. The memory controller 106 may be configured to push pending memory operations from the same port or source, but not the same flow, as a newly received memory operation specifying a higher QoS level. As another example, memory controller 106 may be configured to couple to a sideband interface from one or more agents, and may upgrade QoS levels responsive to receiving an upgrade request on the sideband interface. In another example, memory controller 106 may be configured to track the relative age of the pending memory operations. Memory controller 106 may be configured to upgrade the QoS level of aged memory operations at certain ages. The ages at which upgrade occurs may depend on the current QoS parameter of the aged memory operation.

Memory controller 106 may be configured to determine the memory channel addressed by each memory operation received on the ports, and may be configured to transmit the memory operations to memory 102A-102B on the corresponding channel. The number of channels and the mapping of addresses to channels may vary in various embodiments and may be programmable in the memory controller. Memory controller 106 may use the QoS parameters of the memory operations mapped to the same channel to determine an order of memory operations transmitted into the channel.

Processors 116 may implement any instruction set architecture, and may be configured to execute instructions defined in that instruction set architecture. For example, processors 116 may employ any microarchitecture, including but not limited to scalar, superscalar, pipelined, superpipelined, out of order, in order, speculative, non-speculative, etc., or combinations thereof. Processors 116 may include circuitry, and optionally may implement microcoding techniques, and may include one or more level 1 caches, making cache 118 an L2 cache. Other embodiments may include multiple levels of caches in processors 116, and cache 118 may be the next level down in the hierarchy. Cache 118 may employ any size and any configuration (set associative, direct mapped, etc.).

Graphics controllers 112A-112B may be any graphics processing circuitry. Generally, graphics controllers 112A-112B may be configured to render objects to be displayed, into a frame buffer. Graphics controllers 112A-112B may include graphics processors that may execute graphics software to perform a part or all of the graphics operation, and/or hardware acceleration of certain graphics operations. The amount of hardware acceleration and software implementation may vary from embodiment to embodiment.

NRT peripherals 120 may include any non-real time peripherals that, for performance and/or bandwidth reasons, are provided independent access to memory 102A-102B. That is, access by NRT peripherals 120 is independent of CPU block 114, and may proceed in parallel with memory operations of CPU block 114. Other peripherals such as peripheral 126 and/or peripherals coupled to a peripheral interface controlled by peripheral interface controller 122 may also be non-real time peripherals, but may not require independent access to memory. Various embodiments of NRT peripherals 120 may include video encoders and decoders, scaler/rotator circuitry, image compression/decompression circuitry, etc.

Bridge/DMA controller 124 may comprise circuitry to bridge peripheral(s) 126 and peripheral interface controller(s) 122 to the memory space. In the illustrated embodiment, bridge/DMA controller 124 may bridge the memory operations from the peripherals/peripheral interface controllers through CPU block 114 to memory controller 106. CPU block 114 may also maintain coherence between the bridged memory operations and memory operations from processors 116/L2 Cache 118. L2 cache 118 may also arbitrate the bridged memory operations with memory operations from processors 116 to be transmitted on the CPU interface to CPU port 108C. Bridge/DMA controller 124 may also provide DMA operation on behalf of peripherals 126 and peripheral interface controllers 122 to transfer blocks of data to and from memory. More particularly, the DMA controller may be configured to perform transfers to and from memory 102A-102B through memory controller 106 on behalf of peripherals 126 and peripheral interface controllers 122. The DMA controller may be programmable by processors 116 to perform the DMA operations. For example, the DMA controller may be programmable via descriptors, which may be data structures stored in memory 102A-102B to describe DMA transfers (e.g. source and destination addresses, size, etc.). Alternatively, the DMA controller may be programmable via registers in the DMA controller (not shown).

Peripherals 126 may include any desired input/output devices or other hardware devices that are included on IC 101. For example, peripherals 126 may include networking peripherals such as one or more networking media access controllers (MAC) such as an Ethernet MAC or a wireless fidelity (WiFi) controller. An audio unit including various audio processing devices may be included in peripherals 126. Peripherals 126 may include one or more digital signal processors, and any other desired functional components such as timers, an on-chip secrets memory, an encryption engine, etc., or any combination thereof.

Peripheral interface controllers 122 may include any controllers for any type of peripheral interface. For example, peripheral interface controllers 122 may include various interface controllers such as a universal serial bus (USB) controller, a peripheral component interconnect express (PCIe) controller, a flash memory interface, general purpose input/output (I/O) pins, etc.

Memories 102A-102B may be any type of memory, such as dynamic random access memory (DRAM), synchronous DRAM (SDRAM), double data rate (DDR, DDR2, DDR3, etc.) SDRAM (including mobile versions of the SDRAMs such as mDDR3, etc., and/or low power versions of the SDRAMs such as LPDDR2, etc.), RAMBUS DRAM (RDRAM), static RAM (SRAM), etc. One or more memory devices may be coupled onto a circuit board to form memory modules such as single inline memory modules (SIMMs), dual inline memory modules (DIMMs), etc. Alternatively, the devices may be mounted with IC 101 in a chip-on-chip configuration, a package-on-package configuration, or a multi-chip module configuration.

Memory PHYs 104A-104B may handle the low-level physical interface to memory 102A-102B. For example, memory PHYs 104A-104B may be responsible for the timing of the signals, for proper clocking to synchronous DRAM memory, etc. In one embodiment, memory PHYs 104A-104B may be configured to lock to a clock supplied within IC 101 and may be configured to generate a clock used by memory 102A and/or memory 102B.

It is noted that other embodiments may include other combinations of components, including subsets or supersets of the components shown in FIG. 1 and/or other components. While one instance of a given component may be shown in FIG. 1, other embodiments may include one or more instances of the given component.

Figure 2:
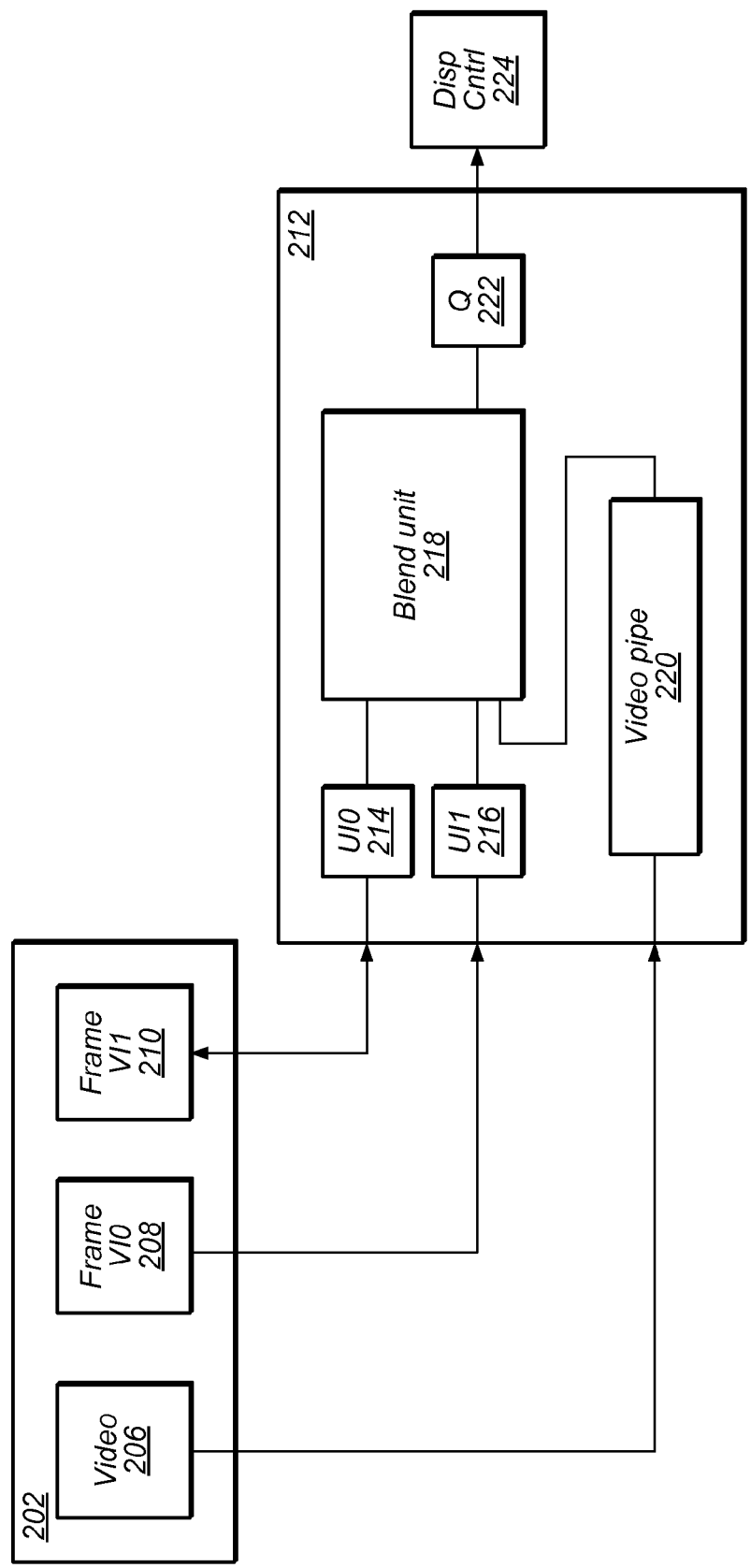
FIG. 2 is a block diagram of one embodiment of a graphics display system including system memory.

Turning now to FIG. 2, a partial block diagram is shown providing an overview of an exemplary system in which image frame information and video frame information may be stored in memory 202, which may be system memory, and provided to a display pipe 212. As shown in FIG. 2, memory 202 may include a video buffer 206 for storing video frames/information, and one or more (in the embodiment shown, a total of two) image frame buffers 208 and 210 for storing image frame information. In some embodiments, the video frames/information stored in video buffer 206 may be represented in a first color space, according the origin of the video information. For example, the video information may be represented in the YCbCr color space. At the same time, the image frame information stored in image frame buffers 208 and 210 may be represented in a second color space, according to the preferred operating mode of display pipe 212. For example, the image frame information stored in image frame buffers 208 and 210 may be represented in the RGB color space. Display pipe 212 may include one or more user interface (UI) units, shown as UI 214 and 216 in the embodiment of FIG. 2, which may be coupled to memory 202 from where they may fetch the image (frame) data/information and perform various operations on the image data. A video pipe or processor 220 may be similarly configured to fetch the video data from memory 202, more specifically from video buffer 206, and perform various operations on the video data. UI 214 and 216, and video pipe 220 may respectively provide the processed fetched image frame information and video image information to a blend unit 218 to generate output frames that may be stored in a buffer 222, from which they may be provided to a display controller 224 for display on a display device (not shown), for example an LCD.

In one set of embodiments, UI 214 and 216 may include one or more registers programmable to define at least one active region per frame stored in buffers 208 and 210. Active regions may represent those regions within an image frame that contain pixels that are to be displayed, while pixels outside of the active region of the frame are not to be displayed. In order to reduce the number of accesses that may be required to fetch pixels from frame buffers 208 and 210, when fetching frames from memory 202 (more specifically from frame buffers 208 and 210), UI 214 and 216 may fetch only those pixels of any given frame that are within the active regions of the frame, as defined by the contents of the registers within UI 214 and 216. The pixels outside the active regions of the frame may be considered to have an alpha value corresponding to a blend value of zero. In other words, pixels outside the active regions of a frame may automatically be treated as being transparent, or having opacity of zero, thus having no effect on the resulting display frame. Consequently, the processed fetched pixels may be blended with pixels from other frames, and/or from processed video frame or frames provided by video pipe 220 to blend unit 218.

Figure 3:
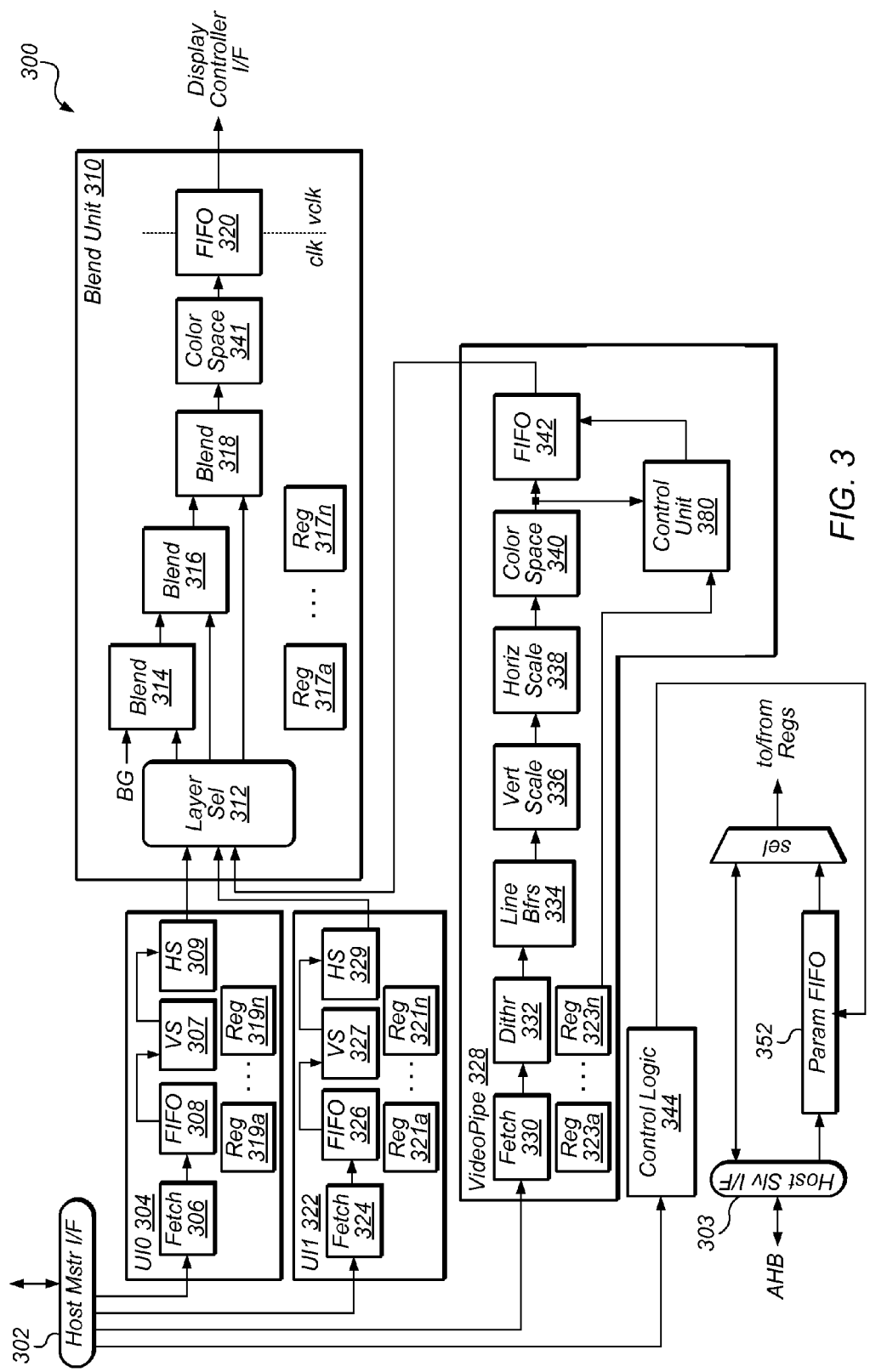
FIG. 3 is a block diagram of one embodiment of a display pipe in a graphics display system.

Turning now to FIG. 3, a more detailed logic diagram of one embodiment 300 of display pipe 212 is shown. In one set of embodiments, display pipe 300 may function to deliver graphics and video data residing in memory (or some addressable form of memory, e.g. memory 202 in FIG. 2) to a display controller or controllers that may support both LCD and analog/digital TV displays. The video data, which may be represented in one color space, for example the YCbCr color space, may be dithered, scaled, converted to another color space (for example the RGB color space) for use in blend unit 310, and blended with up to a specified number (e.g. 2) of graphics (user interface) planes that are also represented in the second (i.e. RGB) color space. Display pipe 300 may run in its own clock domain, and may provide an asynchronous interface to the display controllers to support displays of different sizes and timing requirements. Display pipe 300 may consist of one or more (in this case two) user interface (UI) blocks 304 and 322 (which may correspond to UI 214 and 216 of FIG. 2), a blend unit 310 (which may correspond to blend unit 218 of FIG. 2), a video pipe 328 (which may correspond to video pipe 220 of FIG. 2), a parameter FIFO 352, and Master and Slave Host Interfaces 302 and 303, respectively. The blocks shown in the embodiment of FIG. 3 may be modular, such that with some redesign, user interfaces and video pipes may be added or removed, or host master or slave interfaces 302 and 303 may be changed, for example.

As mentioned above, display pipe 300 may be designed to fetch data from memory, process that data, then presents it to an external display controller through an asynchronous FIFO 320. The display controller may control the timing of the display through a Vertical Blanking Interval (VBI) signal that may be activated at the beginning of each vertical blanking interval. This signal may cause display pipe 300 to initialize (Restart) and start (Go) the processing for a frame (more specifically, for the pixels within the frame). Between initializing and starting, configuration parameters unique to that frame may be modified. Any parameters not modified may retain their value from the previous frame. As the pixels are processed and put into output FIFO 320, the display controller may issue signals (referred to as pop signals) to remove the pixels at the display controller's clock frequency (indicated as vclk in FIG. 3).

In the embodiment shown in FIG. 3, each UI unit may include one or more registers 319a-319n and 321a-321n, respectively, to hold image frame information that may include active region information, base address information, and/or frame size information among others. Each UI unit may also include a respective fetch unit, 306 and 324, respectively, which may operate to fetch the frame information, or more specifically the pixels contained in a given frame from memory, through host master interface 302. As previously mentioned, the pixel values may be represented in the color space designated as the operating color space of the blend unit, in this case the RGB color space, but which may be any designated color space in alternate embodiments. In one set of embodiments, fetch units 306 and 324 may only fetch those pixels of any given frame that are within the active region of the given frame, as defined by the contents of registers 319a-319n and 321a-321n. The fetched pixels may be fed to respective FIFO buffers 308 and 326, from which the UI units may provide the fetched pixels to respective vertical and horizontal scaling units (307 and 327, respectively, and 309 and 329, respectively), from where the scaled pixels may be provided to blend unit 310, more specifically to a layer select unit 312 within blend unit 310. Blend unit 310 may then blend the fetched pixels obtained from UI 304 and 322 with pixels from other frames and/or video pixels obtained from video pipe 328. The pixels may be blended in blend stages 314, 316, and 318 to produce an output frame or output frames, which may then be passed to FIFO 320 to be retrieved by a display controller interface coupling to FIFO 320, to be displayed on a display of choice, for example an LCD. In one set of embodiments, the output frame(s) may be converted back to the original color space of the video information, e.g. to the YCbCr color space, to be displayed on the display of choice.

The overall operation of blend unit 310 will now be described. Blend unit 310 may be situated at the backend of display pipe 300 as shown in FIG. 3. It may receive frames of pixels from UI 304 and 322, and from video pipe 328 through layer select unit 312, and may blend them together layer by layer. In one set of embodiments, the pixels received by blend unit 310 may be represented in a first color space (e.g. RGB), in which blend unit 310 may operate. The frames fetched by UI 304 and UI 322 through host interface 302 may already be represented in the first color space. However, the video image frame information fetched by fetch unit 330 within video pipe 328 may be represented in a second color space (e.g. YCbCr). Thus, the video image frame pixels fetched by video pipe 328 may first be converted to the first color space (in which blend unit 310 may operate) via color space converter 340, and the converted video image frame pixels—now also represented in the first color space—may then be provided to blend unit 310 for blending. The final resultant pixels may be converted to the second color space (e.g. to YCbCr) through color space converter unit 341, queued up in output FIFO 320 at the video pipe's clock rate of clk, and fetched by a display controller at the display controller's clock rate of vclk. It should be noted that while FIFO 320 is shown inside blend unit 310, alternative embodiments may position FIFO 320 outside blend unit 310 and possibly within a display controller unit. In addition, while color space conversion by converter unit 341 is shown to take place prior to providing the resultant pixels to FIFO 320, in alternate embodiments the color conversion may be performed on the data fetched from FIFO 320.

The sources to blend unit 310 (UI 304 and 326, and/or video pipe 328) may provide the pixel data and per-pixel Alpha values for an entire frame with width, display width, and height, display height, in pixels starting at a specified default pixel location, (e.g. 0,0). Blend unit 310 may functionally operate on a single layer at a time, that is, blending two layers at a time, one layer representing a pre-blended or previously blended layer. The lowest layer may be defined as the background color (BG, provided to blend stage 314).

Layer 1 may blend with layer 0 (at blend stage 316). The next layer, layer 2, may blend with the output from blend stage 316 (at blend stage 318), and so on until all the layers are blended. For the sake of simplicity, only three blend stages 314-318 are shown, but display pipe 300 may include more or less blend stages depending on the desired number of processed layers. Each layer (starting with layer 1) may specify where its source comes from to ensure that any source may be programmatically selected to be on any layer. As mentioned above, as shown, blend unit 310 has three sources (UI 304, UI 322, and video pipe 328) to be selected onto three layers (using blend stages 314-318). A CRC (cyclic redundancy check) may also be performed on the output of blend unit 310. Blend unit 310 may also be put into a CRC only mode, where only a CRC is performed on the output pixels without the output pixels being sent to the display controller.

As mentioned above, each source (UI 304 and 322, and video pipe 328) may provide a per-pixel Alpha value. The Alpha values may be used to perform per-pixel blending, may be overridden with a static per-frame Alpha value (e.g. saturated Alpha), or may be combined with a static per-frame Alpha value (e.g. Dissolve Alpha). There may also be an option to have the per-pixel Alpha value pre-multiplied with the color component. In one set of embodiments, Alpha values may be represented as 8-bit indices that represent a value V, in the range $0 <= V <= 1.0$, where V=Alpha/255. In other words, the Alpha value may in fact represent a value in the range of 0 to 1 through an 8-bit value that is eventually normalized through division. More generally, the Alpha values may be represented as N-bit indices that correspond to V (as indicated above), the N-bit indices eventually normalized by being divided by $2^N-1$, yielding a value V=Alpha/$2^N-1$. Any pixel locations outside of a source's valid region may not be used in the blending. The layer underneath it may show through as if that pixel location had an Alpha value of zero. An Alpha of zero for a given pixel may indicate that the given pixel is invisible, and will not be displayed.

FIG. 4 shows a table 400 with different possible blend equations corresponding to different possible blending modes, according to one embodiment. In a 'Normal' mode, per-pixel Alpha values are combined with a dissolve Alpha value. In a 'Premultiplied' mode, per-pixel premultiplied Alpha values are combined with a dissolve Alpha value. In a 'Saturate' mode, the per-pixel Alpha values are overridden by a static per-frame Alpha value, or saturated Alpha value. As expressed in table 400, 'C[k,i]' represents the color component from layer [k] at pixel position [i], 'A[k,i]' represents the Alpha component from layer [k] at pixel position [i] (i.e. the per pixel Alpha value), 'ASat[k]' represents the static saturate Alpha value for layer [k] (i.e. the overriding static per-frame Alpha value), and 'ADis[k]' represents the static Dissolve Alpha value for layer [k] (i.e. the combining static per-frame Alpha value). Since the same per-pixel Alpha values may be used for each color component of a given pixel, an effective Alpha value (AEffCur[i]) for the current layer (k), and an effective Alpha value (AEffPrev[i]) for the layer underneath (k−1) may be calculated per pixel, and blended with each color component for the given pixel. Calculation of these effective Alpha values is tabulated in table 500 in FIG. 5. These effective Alpha values may then be used in the blend calculations for each color component for a given pixel, expressed by the blend equation:

$$Cout[k,i] = AEffCur[i]*C[k,i] + (1-AEffPrev[i])*Cout[k-1,i] \quad (1)$$

where Cout[k,i] is the output value for layer 'k' at pixel position 'i', C[k,i] is the input value for layer 'k' at pixel position 'i', and Cout[k−1,i] is the output value for the previous layer 'k−1' at pixel position 'i'. It should be noted that in premultiplied mode, the current per-pixel Alpha value may be different from the previous per-pixel Alpha value, leading to the result overflowing, with all values in the result clamped to a value of '1'.

As previously noted, blend unit 310 in display pipe 300 may include multiple blend stages, (or blending stages) as exemplified by blend stages 314-318, which may blend multiple image layers into a single image layer. According to blend equation (1) as defined in tables 400 and 500, the output of each blend stage may be a fully blended color value for each color component of the given color space corresponding to a given layer. These color values may then be blended with the color values and Alpha value corresponding to the next layer, in a subsequent blend stage. In the embodiment shown in FIG. 3, at least four layers may be blended. A background layer (BG inside blend unit 310), a first image layer (from UI 304), a second image layer (from UI 322), and a video frame image layer (from video pipe 328). The color values (which may include a separate respective value in each color plane/component for a given pixel, e.g. an 'R' color plane value, a 'G' color plane value, and a 'B' color plane value) and Alpha values may all be in the range of '0' to '1', expressed as corresponding multi-bit values during processing, e.g. as 10-bit values for each color plane component, and 8-bit values for the Alpha. It should be noted, that the number of bits used for the Alpha value and the color values, respectively, may vary depending on various processing considerations. For example, as will be further discussed below, under certain circumstances, the number of color bits in a given first color space may be extended to include additional values that may not be valid in the given first color space, when converting from a second color space to the first color space, thereby adding to the number of bits used for representing the color values in the given first color space (e.g. when converting from the YCbCr color space to the RGB color space).

When performing blend operations using multi-bit data values, if the blend operation involves the multiplication of two N-bit numbers, the operation may yield a 2N-bit number. In order to return to the originally specified number of bits (i.e. N bits), this number is typically normalized by dividing the result by a number equal to '$2^N-1$'. Blend equation (1) may be implemented as a multi-step blend process, according to which each blend stage (314-318) may include multiple blend levels, as shown above. This means that each multiplication (by an Alpha value) also anticipates a corresponding normalization of the result. A straightforward way of implementing blend equation (1) according to tables 400 and 500 may yield one calculation for the effective Alpha value, and a specified number of additional calculations, each calculation performed to blend the effective Alpha value with color values of the previous layer and color values of the current layer per color component. Thus, for example, when operating in the RGB color space, there are three additional calculations, one for the 'R' color component, one for the 'G' color component, and one for the 'B' color component. These calculations may be represented by the following equations (shown for Normal mode, 8-bit Alpha values, and 10-bit color values for the purposes of illustration—other modes may be similarly derived based on tables 400 and 500 and the appropriate number of bits used for Alpha values and color values, as specified) per each blend stage:

$$AE[7:0] = (AD[7:0]*AP[7:0])/d255 \quad (2)$$

where AE is the effective Alpha value (which has the same value for current layer and previous layer in Normal mode, as indicated in table 500), AD is the dissolve value (combined per-frame static Alpha value), and AP is the per-pixel Alpha value, $$CO[9:0]=((CCL[9:0]*AE[7:0])/\text{'}d255)+((CPL[9:0]*(\text{'}d255-AE[7:0])/\text{'}d255) \quad (3)$$

where CO is the resultant color value of the given pixel for the given color component at the blend stage output, CCL is the color value of the given pixel for the given color component for the current layer, and CPL is the color value of the given pixel for the given color component for the previous layer. As previously mentioned, the previous layer represents the result from a previous blend stage, and the current layer is the layer to be blended with the results of the previous blend stage.

As observed in the above equations, normalization may be performed in three separate instances, once for each term that includes a multiplication by the Alpha component. The normalization division, however, may introduce errors, because the divide operation may be restricted to a fixed point, resulting in fractional portions being dropped. These dropped fractional portions may add up over all these levels (i.e. when performed for each term), resulting in ever-greater inaccuracies carried through each blend stage. However, color value normalizations are not required when the desired result is an actual color value, only at the end of a blend operation, where it may be necessary to normalize for the accumulated Alpha multiplications. In other words, equation (1) may be implemented in such a way as to delay the normalization, in effect reducing the actual number of divisions, thereby reducing the total number of fractional portions being dropped. Thus, normalization for the Alpha-value multiplications may not be performed at each blend level, carrying the results forward in fractional form instead, until the blending process is complete. Due to the exponential nature of the increase in the number of bits when carrying the results in fractional form, the extent to which intermediate results may be carried in fractional form may be determined by practical design and implementation considerations. In one set of embodiments, blend stages 314-318 may each perform a single division at the output of the blend stage, preventing the compounding of errors that may be incurred at each blend level within each given blend stage, if a division at each blend level were performed.

Thus, with respect to the blend operation, instead of performing the divide operation at the various levels within a blend stage, the denominator in equations (2) and (3) may be maintained (normalization not performed), and the denominators may be combined, performing the divide operation at the end, that is, at least at the output of a given blend stage. For example, a more accurate implementation of equation (1) may combine equations (2) and (3) into the following equation, which may apply to each color component within the given color space (using the same parameters that were used for equations (2) and (3)):

$$CO[9:0]=(CCL[9:0]*AD[7:0]*AP[7:0]+CPL[9:0]*(\text{'}d65025-AD*AP))/\text{'}d65025 \quad (4)$$

It should be noted that 'd65025 is 'd255 squared. As seen in equation (4), instead of calculating and normalizing the effective Alpha value, the blend operation is flattened out, and instead of the three divisions that were performed as per equations (2) and (3), only a single division is performed. While mathematically the combination of equations (2) and (3) is identical to equation (4), because each divide may introduce up to ½ a least significant bit of error, equation (4) may represent a significantly more accurate implementation of equation (1).

Figure 6A:
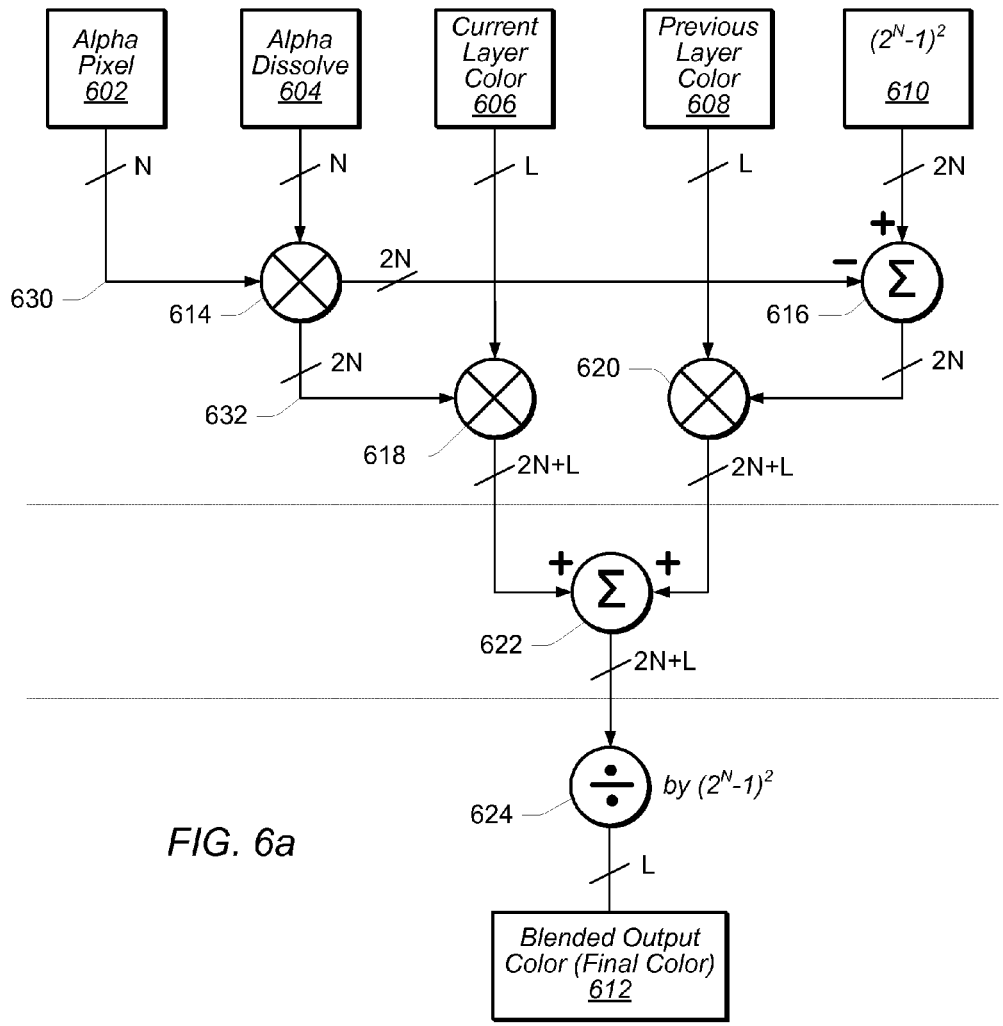
FIG. 6a shows the schematic diagram of a blend stage for blending frame pixels of two image layers, according to one embodiment.
Figure 6B:
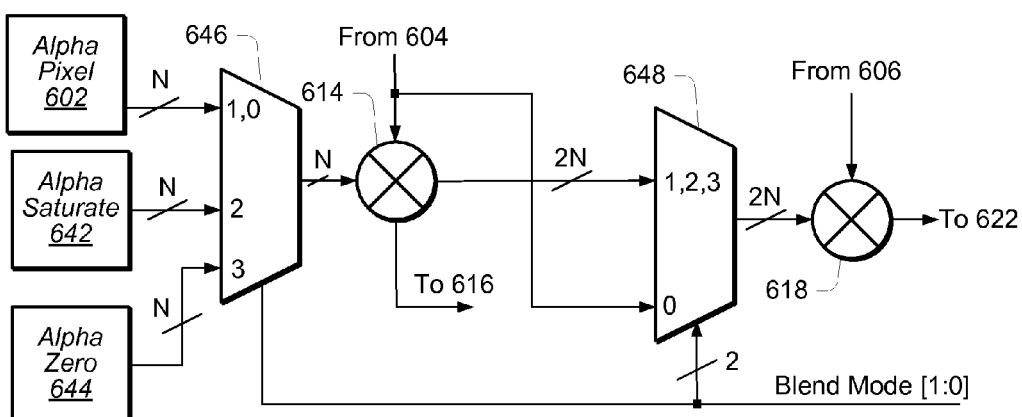
FIG. 6b shows the logic diagram of a selection mechanism for programming the blend stage of FIG. 6a to blend according one of different possible blend modes, according to one embodiment.

FIG. 6a shows the schematic diagram of one possible embodiment of a blend stage, (e.g. any of blend stages 314-318) for blending frame pixels of two image layers. The schematic in FIG. 6 shows the schematic for Normal blending mode implemented according to equation (4). It should be noted that the schematic of FIG. 6a may be modified to include other blending modes (e.g. Premultiplied mode, Saturate mode, and Disabled mode) based on the equations shown in table 400. This may be accomplished in a variety of different ways. For example, an enable signal may be used to output blended output color 612 (in Normal mode, Premultiplied mode and Saturate mode), or previous layer color 608 (in Disabled mode). For purely illustrative purposes, FIG. 6b shows the schematic diagram of one possible selection block that may be incorporated into the blend stage shown in FIG. 6a, as will be further explained later. As seen in FIG. 6a, per-pixel Alpha value 602 may be multiplied with per-frame Alpha dissolve value (at 614), and the 2N-bit wide result may be multiplied by the current layer color value 606 (at 618), and also subtracted from a value of $(2^N-1)^2$ 610, which is a 2N-bit wide representation of the normalized value '1' (at 616), then multiplied by the previous layer color value 608 (at 620). In one sense, the input 632 to multiplication element 618 may be considered the effective Alpha value for the current layer (k), and the output of summation element 616 into multiplication element 320 may be considered the effective Alpha value for the previous layer (k−1). Note that the use of the term "effective Alpha value" in this context differs from its use in Tables 400 and 500. For ease of understanding, the effective Alpha value corresponding to previous layer color 608 may be designated as the value (derived from the Alpha values) with which previous layer color 608 is multiplied. The results of multiplications 618 and 620 may then be summed (at 622), and the resulting sum may be divided by $(2^N-1)^2$ 610 (at 624), thereby producing a normalized, L-bit wide blended output color value 612. As indicated by the number of bits on each line, the results of the individual multiplications are carried without being normalized, resulting in a color value having a bit-length of 2N+L at the output of summation element 622.

As mentioned above, FIG. 6b shows the schematic diagram of one possible selection block that may be incorporated into the blend stage shown in FIG. 6a. More specifically, path 630 from the output of Alpha Pixel 602 to multiplication element 614 may be replaced by the output of selection element 646, and path 632 from multiplication element 614 to multiplication element 618 may be replaced by the output of selection element 648. A Blend Mode signal (which may be a 2-bit signal, as two bits are sufficient to express all four different blend modes) may be used to select between the different inputs to selection element 646. In the example shown, the (decimal) value of '0' corresponds to Premultiplied mode, the value of '1' corresponds to Normal mode, the value of '2' corresponds to Saturate mode, and the value of '3' corresponds to Disabled mode. For example, in Premultiplied mode, Alpha Pixel value 602 is selected by the Blend Mode signal as the input of selection element 646, which consequently outputs Alpha Pixel value 602 to multiplication element 614. The Blend Mode signal also selects the Alpha Dissolve value 604 as the input of selection element 648, which consequently outputs Alpha Dissolve value 604 to multiplication element 618. For all other blend modes, the Blend Mode signal may select the output of multiplication element 614 as the input of selection element 648 to output to multiplication element 618. For Normal Mode, Alpha Pixel value 602 is provided to multiplication element 614 (just as in FIG. 6a), in Saturate Mode, Alpha Saturate value 642 is provided to multiplication element 614, and finally, in Disabled mode, a zero Alpha value 644 is provided to multiplication element 614. As mentioned above, FIG. 6b merely represents one possible embodiment of multiple blend modes being supported when using the implementation of a single blend stage exemplified in FIG. 6a.

Theoretically, if M layers are combined (M=4 in the embodiment shown in FIG. 3), and normalization is performed for multiplications by Alpha values (that are represented as N-bit indices), the division may be performed at the output of a last blend stage (e.g. blend stage 318 for the embodiment shown in FIG. 3) in the form of a division by $(2^N-1)^P$, where $P=2^{[M-1]}$. For example, when carrying the results through two blend stages (i.e. 3 layers), P equals $2^2$ (i.e. 4), and the denominator equals $(2^N-1)^4$. For 8-bit Alpha values, the value of this denominator is $255^4$, i.e. 4,228,250,625. As is evident, the bit-size of the denominator may increase exponentially, and it may or may not be efficient to carry the results through multiple blend stages within certain designs. However, a significant reduction in the error introduced by the divisions may still be achieved by implementing equation (1) according to the schematic of FIG. 6a for each blend stage. In such embodiments, the division may be performed at the end of each stage by division element 624, leading to the output of each blend stage providing an L-bit wide output as the Previous Layer color value (608) to a next blend stage, until the final blend stage, which may produce the final color output.

When carrying the results through the final blend stage, the input of each subsequent blend stage may be a non-normalized color value. For example, if normalization is not performed at the end of blend stage 314, blend stage 314 may output a color value of bit-length of (2N+L), where 'L' is the specified, expected bit-size of the color value, to blend stage 316. In reference to FIG. 6a, this value is represented by the output of summation element 622. Thus, in blend stage 316, the Previous Layer Color input (corresponding to input 608 in FIG. 6a) into the corresponding multiplication element 620 may provide (2N+L) number of bits, instead of the L bits shown in FIG. 6a. Overall, when carrying the blend result in fractional from through each blend stage, the respective Previous Layer Color input of each subsequent blend stage will have the same number of bits as the output produced by the previous blend stage. Without normalization at the output of a given blend stage through multiple stages of blending until the final blend stage (e.g. until blend stage 318 in FIG. 3), the non-normalized output of each given blend stage, (except the final blend stage, which may have a normalized output) may be expressed by the following equation, when blending a total of 'M' layers, in Normal mode, with N-bit wide Alpha values, and L-bit wide color values:

$$CO[L-1:0]=CCL[L-1:0]*AD[N-1:0]*AP[N-1:0]*(2^N-1)^2+CPL[X:0]*((2^N-1)^2-AD[N-1:0]*AP[N-1:0]) \quad (5)$$

where X=2N+(M−1)*L. Normalization may then be performed at the end of the final blend stage, which may produce a final color output expressed by the following equation, when blending a total of 'M' layers, each blend stage blending two sets of pixel data respectively corresponding to two layers, one of those sets of pixels received from the output of a previous blend stage:

$$CO[L-1:0]=(CCL[L-1:0]*AD[N-1:0]*AP[N-1:0]*(2^N-1)^2+CPL[X:0]*((2^N-1)^2-AD[N-1:0]*AP[N-1:0]))/(2^N-1)^P \quad (6)$$

where, as previously noted, $P=2^{[M-1]}$.

In one set of embodiments, valid source regions, referred to as active regions may be defined as the area within a frame that contains valid pixel data. Pixel data for an active region may be fetched from memory by UI 304 and 322, and stored within FIFOs 308 and 326, respectively. An active region may be specified by starting and ending (X,Y) offsets from an upper left corner (0,0) of the entire frame. The starting offsets may define the upper left corner of the active region, and the ending offsets may define the pixel location after the lower right corner of the active region. Any pixel at a location with coordinates greater than or equal to the starting offset and less than the ending offset may be considered to be in the valid region. Any number of active regions may be specified. For example, in one set of embodiments there may be up to four active regions defined within each frame and may be specified by region enable bits. The starting and ending offsets may be aligned to any pixel location. An entire frame containing the active regions may be sent to blend unit 310. Any pixels in the frame, but not in any active region would not be displayed, and may therefore not participate in the blending operation, as if the pixels outside of the active had an Alpha value of zero. In alternate embodiments, blend unit 310 may be designed to receive pixel data for only the active regions of the frame instead of receiving the entire frame, and automatically treat the areas within the frame for which it did not receive pixels as if it had received pixels having a blending value (Alpha value) of zero.

In one set of embodiments, the active regions in a frame may represent graphics overlay to appear on top of another image or a video stream. For example, the active regions may represent a static image superimposed atop a video stream. In some embodiments, active regions may more generally represent an overlay window that may be used to superimpose any desired information atop information presented in the background layer underneath. For example, display pipe 212 may include more than one video pipe similar to video pipe 220 (or 328, as shown in FIG. 3), and overlay video information in the active region. Similarly, instead of a video stream, static images may be displayed underneath the active regions, and so forth. Referring again to FIG. 3, video pipe 328 may provide a video stream to blend unit 310, while UI 304 and 322 may provide image frames with pixels in the active region representing a static image overlay to be displayed atop the video stream. In this case, the output frames provided from FIFO 320 to the display controller may include video pixel information from video pipe 328, with the fetched pixels from FIFO 308 (which may first be scaled by vertical scaling block 307 and horizontal scaling block 309) and/or FIFO 326 (which may first be scaled by vertical scaling block 327 and horizontal scaling block 329) superimposed on top of the video pixel information, blended together by blend unit 310 according to the Alpha values and other pertinent characteristics of the fetched pixels, as described above with reference to blend unit 310. Again, different embodiments may include various combinations of video and static image information blended and displayed in a similar manner, with the functionality of the display pipe expanded accordingly with additional video pipes and/or user interfaces as needed. Blend unit 310 may similarly be expanded to accommodate the additional pixels that may need to be blended.

In one set of embodiments, using fetch unit 330, video pipe 328 may fetch video frame data/information from memory through host master interface 302. The video frame data/information may be represented in a given color space, for example YCbCr color space. Video pipe 328 may insert random noise (dither) into the samples (dither unit 332), and scale that data in both vertical and horizontal directions (scalers 336 and 338) after buffering the data (buffers 334). In some embodiments, blend unit 310 may expect video (pixel) data to be represented in a different color space than the original color space (which, as indicated above, may be the YCbCr color space). In other words, blend unit 310 may operate in a second color space, e.g. in the RGB color space. Therefore, the video frame data may be converted from the first color space, in this case the YCbCr color space, to the second color space, in this case the RGB color space, by color space converter unit 340. It should be noted that while color space converter unit 340 is shown situated within video pipe 328, it may be situated anywhere between the output provided by video pipe 328 and the input provided to blend unit 310, as long as the data that is ready to be provided to blend unit 310 has been converted from the first color space to the second color space prior to the data being processed and/or operated upon by blend unit 310.

The converted data (that is, data that is represented in the second color space, in this case in the RGB color space) may then be buffered (FIFO 342), before being provided to blend unit 310 to be blended with other planes represented in the second color space, as previously discussed. During the process of converting data represented in the first color space into data represented in the second color space, there may be some colors represented in the first (i.e. the YCbCr) color space that cannot be represented in the second (i.e. RGB) color space. For example, the conversion may yield an R, G, or B component value of greater than 1 or less than 0. Displaying videos on certain display devices may therefore yield different visual results than desired and/or expected. Therefore, in at least one set of embodiments, blend unit 310 may be designed to perform blending operations using the converted pixel values even when the converted pixel values do not represent valid pixel values in the second color space. For example, if the second color space (or the operating color space of blend unit 310) is the RGB color space, blend unit 310 may allow RGB values as high as +4 and as low as −4. Of course these values may be different, and may also depend on what the original color space is. While these values may not represent valid pixel values in the second (i.e. RGB) color space, they can be converted back to the correct values in the first (i.e. the YCbCr) color space. Accordingly, the color information from the original (YCbCr) color space may be maintained through video pipe 328, and may be displayed properly on all display devices that display the video frames. It should therefore also be noted that the bitwise length (noted as 'L' in FIG. 6a, and the corresponding description above) of the color values used in blend unit 310 may differ from what may be expected for the given color space in which blend unit 310 may operate. However, the various embodiments described herein will operate with Alpha values and color values having any specified bit-size, or, in other words, having a width of any specified number of bits.

Thus, before displaying the blended pixels output by final blend stage 318, the blended pixels may be converted from the second color space (i.e. RGB in this case) to the original video color space (i.e. the YCbCr color space in this case) through color space conversion unit 341. As was the case with video pipe 328, while color space conversion unit 341 is shown situated within blend unit 310 and between blend stage 318 and FIFO 320, in alternate embodiments the color space conversion may be performed on the display controller side, prior to being provided to the display, and various other embodiments are not meant to be limited by the embodiment shown in FIG. 3.

Figure 7:
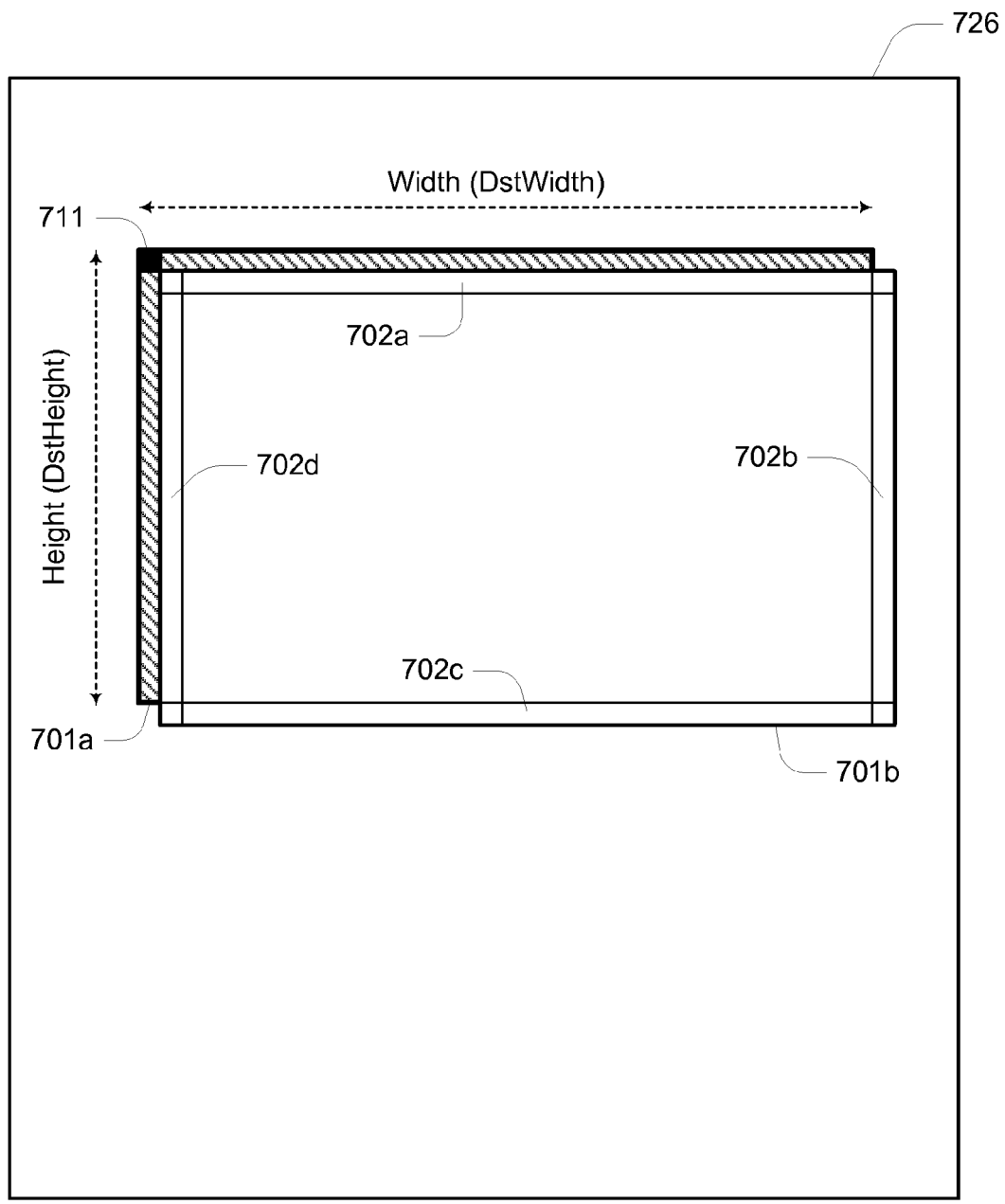
FIG. 7 is a diagram illustrating the placement and movement of a destination frame within a display frame, according to one embodiment.

In a manner similar to valid source regions, referred to as active regions (as discussed above), at least one valid video window, or video destination frame (destination frame, for short) may also be defined. Any active region or destination frame (and their respective contents) may be translated, or moved across the display frame in a specified direction of travel. FIG. 7 provides an illustration of how a destination frame may be moved. Active regions may be moved in a similar manner as what will be further described below. In FIG. 7, a destination frame 701 is represented at a starting position as 701a, and is represented at a next position as 701b. In the example shown, destination frame 701 is moved down and to the right. Video Pipe 328 may produce the video window (destination frame) having a specified height designated as DstHeight, and further having a specified width, designated as DstWidth. The number of valid pixels produced by the video pipe 328 may be the product of DstHeight and DstWidth. The destination frame may be provided to blend unit 310 to be blended with image information obtained from UI 304 and UI 322. The destination frame may be placed at an X,Y offset (711) within display frame 726. Video pipe 328 may provide a complete frame of pixels to blend unit 310, but any pixels not in the destination frame may be considered not in a valid region and may not blended in blend unit 310. All pixels not at the edges of the destination frame may have a same static Alpha value, for example a static Alpha value of 1.0, indicating that all video information inside the edges of the destination may have full opacity. In FIG. 7, the edges of destination frame 701 are indicated as edges 702a-702d.

In order to provide smoother translation of destination frame 701 across display screen 726, pixels along the destination frame edges 702a-702d may have programmable per-edge Alpha values. Corner pixels (i.e. the corner formed by edges 702a and 702b, the corner formed by edges 702b and 702c, the corner formed by edges 702c and 702d, and the corner formed by edges 70da and 702a) may be associated with an edge Alpha value equal to the respective edge Alpha values of the edges forming the corner being multiplied together. E.g., the edge Alpha value associated with the corner pixel formed by edges 702a and 702b may be obtained by multiplying together the edge Alpha value associated with edge 702a and the edge Alpha value associated with edge 702b. In essence, the edge Alpha values provide means for simulating movement of the destination frame that isn't on a pixel boundary. In other words, it allows for translating the destination frame across the screen at what appears to be a partial pixel movement. When animating the destination frame, slowly moving it across the screen, stepping may only be possible one pixel at a time, in whole pixel increments, resulting in a picture/movement that may not appear as smooth as desired. Thus, Alpha values different from the Alpha value of the entire destination frame may be applied to the edges 702a-702d during blending. In a sense, the edges may be made partially transparent, causing the image in the destination frame to appear as if it were "partially out of" the source pixel location and "partially into" the destination pixel location.

For example, as seen in FIG. 7, destination frame 701 at position 701b is shown to be a pixel to the right and a pixel down from original offset position 711. However, according to the rate of translation, the destination position 701b may have been designated as being less than a pixel to the right and less than a pixel down from original offset position 711. For example the nominal destination position of the destination frame may have been 1.25 pixels to the right and 1.25 pixels down from original offset position 711. However, since the destination frame may only actually rest on a pixel boundary, destination frame (position) 701b may be moved one pixel to the right and one pixel down, as shown in FIG. 7. Considering the horizontal direction, in the direction of travel (i.e. to the right hand side), the edge Alpha value for edge 702*b* may be specified to be 0.25, representing edge 702*b* "being 25% into" its corresponding actual destination pixel area, and the edge Alpha value for edge 702*d* may be specified to be 1−0.25=0.75, representing edge 702 *d* "being 25% out of" its corresponding actual destination pixel area. Therefore, in one sense, making edges 702*a*-702*d* partially transparent may simulate a sub-pixel rate of motion. Opposing edges (e.g. top/bottom—702*a* and 702*b*, left/right—702*d* and 702*b*) perpendicular to the direction of motion may be programmed to total an Alpha value of 1, with the corners programmed with a multiple of the respective Alpha values of the joining edges. Transparency may be used to make it appear as if the image pixels at the edges didn't occupy the entire respective pixel areas (pixel square).

In one set of embodiments, the edge Alpha values, which may include a respective edge Alpha value corresponding to each of the four edges of a destination frame, may be programmed into any one or more registers 323*a*-323*n* within video pipe 328. A control unit 380 may receive the processed video pixels from color space converter 340, and may receive the edge Alpha values from registers 323*a*-323*n*. Control circuit 380 may determine which of the processed video pixels represent video information along the edges of the destination frame, and may associate each respective edge Alpha value with all corresponding pixels that represent video information along the given edge corresponding to the given edge Alpha value. Control unit 380 may then provide the processed video pixels and the edge Alpha values through FIFO 342 to blend unit 310 to be blended with image information pixels received through UI 304 and UI 322.

In one set of embodiments, a parameter FIFO 352 may be used to store programming information for registers 319*a*-319*n*, 321*a*-321*n*, 317*a*-317*n*, and 323*a*-323*n*. Parameter FIFO 352 may be filled with this programming information by control logic 344, which may obtain the programming information from memory through host master interface 302. In some embodiments, parameter FIFO 352 may also be filled with the programming information through an advanced high-performance bus (AHB) via host slave interface 303.

Figure 8:
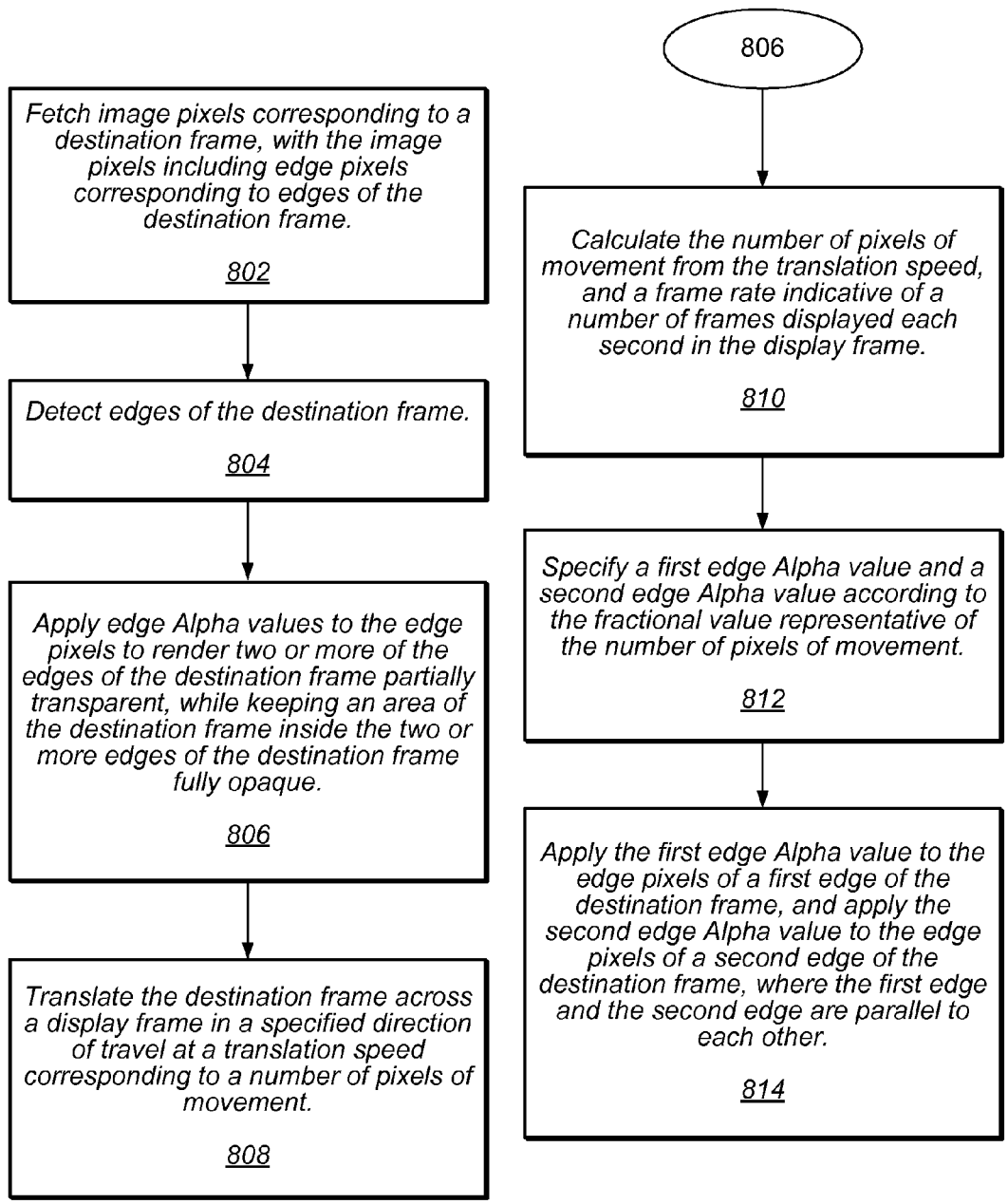
FIG. 8 is a flow chart illustrating one embodiment of a method for moving an image across a screen.

Turning now to FIG. 8, a flowchart is shown illustrating one embodiment of a method for moving an image across a screen. Image pixels corresponding to a destination frame may be fetched, with the image pixels including edge pixels corresponding to edges of the destination frame (802). The edges of the destination frame may then be detected (804), and edge Alpha values may be applied to the edge pixels to render two or more of the edges of the destination frame partially transparent, while keeping an area of the destination frame inside the two or more edges of the destination frame fully opaque (806). The destination frame may thus be translated across a display frame in a specified direction of travel (808), simulating partial pixel movement. The destination frame may be translated across the display frame at a translation speed corresponding to a number of pixels of movement that is a fractional value, not an integer value. In one set of embodiments, applying the edge Alpha values to the edge pixels (806) may include calculating the number of pixels of movement from the translation speed, and a frame rate indicative of a number of frames displayed each second in the display frame (810). A first edge Alpha value and a second edge Alpha value may be specified according to the fractional value representative of the number of pixels of movement (812). The first edge Alpha value may be applied to the edge pixels of a first edge of the destination frame, and the second edge Alpha value may be applied to the edge pixels of a second edge of the destination frame, where the first edge and the second edge are parallel to each other, such as the left edge and right edge, or top edge and bottom edge (814).

Figure 9:
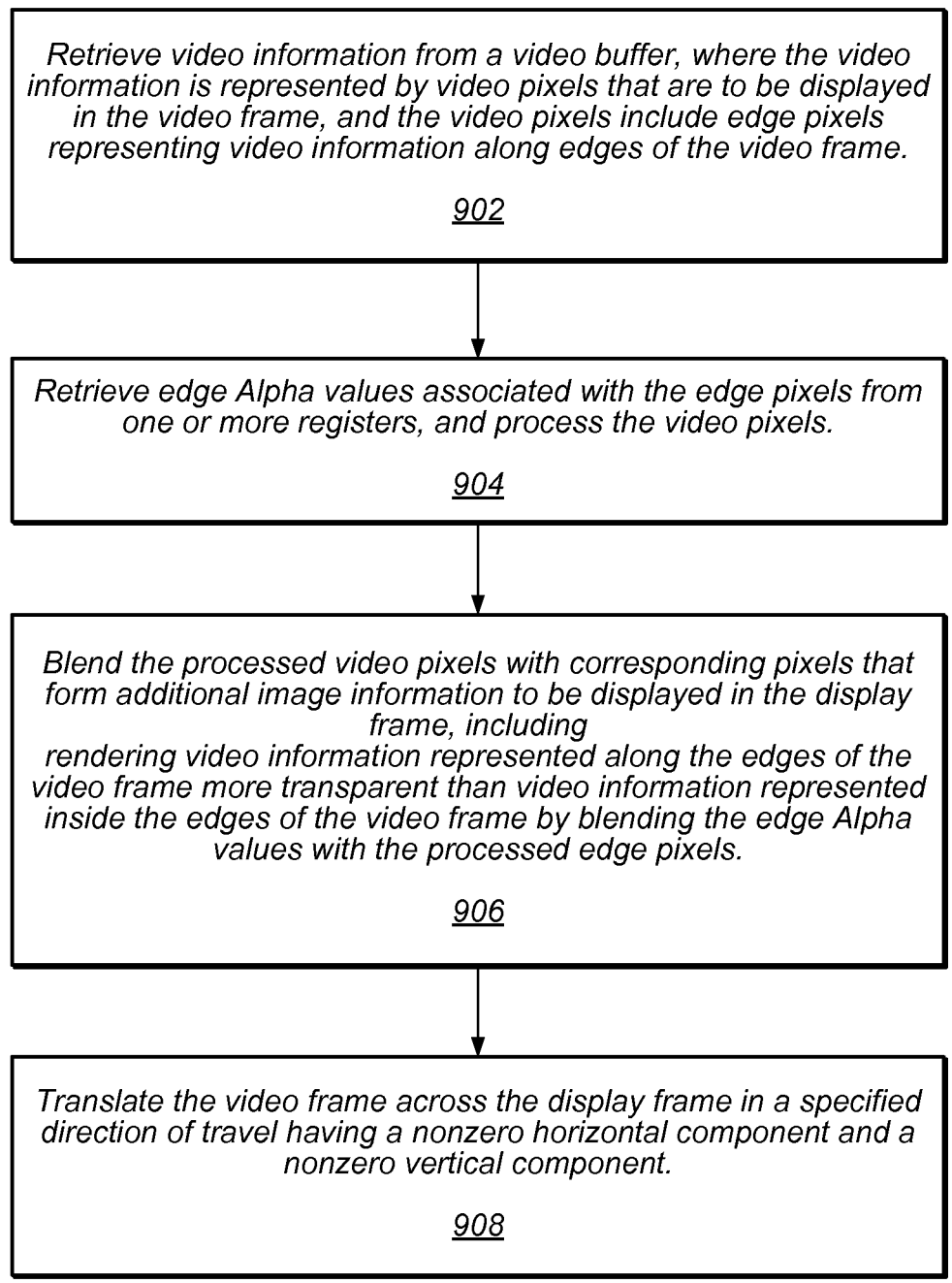
FIG. 9 is a flow chart illustrating one embodiment of a method for displaying a video frame in a display frame.

Turning now to FIG. 9, a flowchart is shown illustrating one embodiment of a method for displaying a video frame in a display frame. Video information may be retrieved from a video buffer, where the video information is represented by video pixels that are to be displayed in the video frame, and the video pixels include edge pixels representing video information along edges of the video frame (902). Edge Alpha values associated with the edge pixels may also be retrieved from one or more registers, and the video pixels may be processed (904). The processed video pixels may be blended with corresponding pixels that form additional image information to be displayed in the display frame (906). The blending process may include rendering video information represented along the edges of the video frame more transparent than video information represented inside the edges of the video frame by blending the edge Alpha values with the processed edge pixels (906). In some embodiments, the video information represented inside the edges of the video frame may be rendered completely opaque. The video frame may be translated across the display frame in a specified direction of travel having a nonzero horizontal component and a nonzero vertical component (908).

In some embodiments, blending step (906) may use a distinct edge Alpha value per edge. For example, the edge Alpha values may include a first, second, third, and fourth edge Alpha value, each one associated with a different edge of the video frame. In other words, each edge Alpha value of the four edge Alpha values may correspond to those respective edge pixels that represent video information along the edge associated with the Alpha value. For example, the first edge Alpha value may be associated with edge pixels that represent video information along the left edge of the video frame, the second Alpha value may be associated with edge pixels that represent video information along the right edge of the video frame, and so forth. During blending, each edge Alpha value may be blended with its corresponding edge pixels. The edge Alpha values associated with the left edge and right edge of the video frame may be determined based on a value of the horizontal component of the specified direction of travel, and the edge Alpha values associated with the top edge and bottom edge of the video frame may be determined based on a value of the vertical component of the specified direction of travel.

Numerous variations and modifications will become apparent to those skilled in the art once the above disclosure is fully appreciated. It is intended that the following claims be interpreted to embrace all such variations and modifications.

We claim:

1. A video pipe comprising:
one or more registers programmable with an edge Alpha value to be applied to an edge of an image, wherein the image is to be translated across an image frame in a specified direction of travel, wherein the edge is perpendicular to the specified direction of travel and wherein the edge Alpha value is based at least on a speed at which the image is to be translated across the image frame; and
a control unit coupled to the one or more registers and configured to:
supply pixels and corresponding Alpha values of the image to a blend unit;
detect the edge of the image; and supply the edge Alpha value from the one or more registers along with pixels forming the edge of the image to the blend unit to be blended with corresponding pixels of the image frame.

2. The video pipe of claim 1, wherein the edge Alpha value is specified based on a fractional pixel value corresponding to the speed at which the image is to be translated across the image frame.

3. The video pipe of claim 1, wherein the edge Alpha value is a fractional value of each of the corresponding Alpha values.

4. The video pipe of claim 1, wherein the corresponding pixels of the image frame are adjacent to the pixels forming the edge of the image.

5. A display pipe comprising:
a fetch unit configured to fetch from a source buffer:
image pixels forming an image to be translated across an image frame in a specified direction of travel, wherein the image pixels comprise edge pixels forming edges of the image and interior pixels comprising the image pixels that are not edge pixels; and
an Alpha value corresponding to the interior pixels;
a register programmable with edge Alpha values associated with the edge pixels and specified based at least on a speed at which the image is to be translated across the image frame; and
a control unit configured to:
identify the edge pixels;
supply the interior pixels and the Alpha value to a blend unit to be blended with pixels of the image frame; and
supply the edge pixels, and the edge Alpha values from the register to the blend unit to be blended with corresponding pixels of the pixels of the image frame.

6. The display pipe of claim 5, further comprising one or more user interface units configured to:
fetch from one or more additional source buffers:
pixels forming one or more additional images; and
respective Alpha values corresponding to the pixels;
supply the pixels and the respective Alpha values to the blend unit to be blended with the pixels of the image frame, the interior pixels, the Alpha value, the edge pixels, and the edge Alpha values.

7. The display pipe of claim 5, wherein the image is a single frame of a video stream.

8. The display pipe of claim 5, wherein the edge pixels comprise first edge pixels forming a first edge of the edges of the image, and second edge pixels forming a second edge of the edges of the image;
wherein the edge Alpha values comprise first edge Alpha value associated with the first edge pixels, and second edge Alpha value associated with the second edge pixels;
wherein the first edge and the second edge are perpendicular to the specified direction of travel; and
wherein a sum of the first Alpha value and the second Alpha value represents an Alpha value corresponding to 100% opacity.

9. A method for moving an image across a screen, the method comprising:
fetching, by a graphics processing system, image pixels corresponding to a destination frame, wherein the image pixels comprise edge pixels corresponding to edges of the destination frame;
detecting, by the graphics processing system, the edges of the destination frame;
applying, by the graphics processing system, edge Alpha values to the edge pixels to render two or more of the edges of the destination frame partially transparent, while keeping an area of the destination frame inside the two or more edges of the destination frame fully opaque, wherein the edge Alpha values are specified based at least on a translation speed at which the destination frame is to be translated across a display frame; and
translating, by the graphics processing system, the destination frame across the display frame in a specified direction of travel.

10. The method of claim 9, wherein applying the edge Alpha values to the edge pixels comprises:
applying a first edge Alpha value of the edge Alpha values to first edge pixels of the edge pixels that correspond to a first edge of the two or more edges of the destination frame; and
applying a second edge Alpha value of the edge Alpha values to second edge pixels of the edge pixels that correspond to a second edge of the two or more edges of the destination frame;
wherein the first edge and the second edge are parallel to each other.

11. The method of claim 10, wherein applying the edge Alpha values to the edge pixels further comprises:
applying a third edge Alpha value of the edge Alpha values to third edge pixels of the edge pixels that correspond to a third edge of the two or more edges of the destination frame; and
applying a fourth edge Alpha value of the edge Alpha values to fourth edge pixels of the edge pixels that correspond to a fourth edge of the two or more edges of the destination frame;
wherein the third edge and the fourth edge are parallel to each other, and perpendicular to the first edge and the second edge.

12. The method of claim 10, wherein translating the destination frame across the display frame in a specified direction of travel comprises translating the destination frame according to a number of pixels of movement corresponding to at least the translation speed, wherein the number of pixels is a fractional value not an integer value.

13. The method of claim 12, further comprising calculating, by the graphics processing system, the number of pixels from the translation speed and a frame rate, wherein the frame rate is indicative of a number of frames displayed each second in the display frame.

14. The method of claim 12, wherein applying the edge Alpha values to the edge pixels comprises:
applying a first edge Alpha value of the edge Alpha values to first edge pixels of the edge pixels that correspond to a first edge of the two or more edges of the destination frame; and
applying a second edge Alpha value of the edge Alpha values to second edge pixels of the edge pixels that correspond to a second edge of the two or more edges of the destination frame;
wherein the first edge and the second edge are parallel to each other; and
wherein the first edge Alpha value and the second edge Alpha value are specified according to the fractional value.

15. A method for displaying a video frame in a display frame, the method comprising:
retrieving video information from a video buffer, wherein the video information is represented by video pixels and corresponds to the video frame, wherein the video pixels comprise edge pixels representing video information along edges of the video frame;

retrieving edge Alpha values associated with the edge pixels from one or more registers, wherein the edge Alpha values are specified based at least on a specified speed at which the video frame is to be translated across the display frame;

processing the video pixels;

blending the processed video pixels with corresponding pixels that form additional image information to be displayed in the display frame, comprising rendering video information represented along the edges of the video frame more transparent than video information represented inside the edges of the video frame by blending the edge Alpha values with the processed edge pixels.

16. The method of claim 15, wherein rendering the video information represented along the edges of the video frame more transparent than the video information represented inside the edges of the video frame comprises rendering the video information represented inside the edges of the video frame completely opaque.

17. The method of claim 15, further comprising translating the video frame across the display frame in a specified direction of travel.

18. The method of claim 17, wherein the specified direction of travel comprises a nonzero horizontal component and a nonzero vertical component.

19. The method of claim 15, wherein the edge Alpha values comprise a first, second, third, and fourth edge Alpha value;

wherein the first edge Alpha value corresponds to a first set of edge pixels of the edge pixels that represent video information along a first edge of the edges of the video frame;

wherein the second edge Alpha value corresponds to a second set of edge pixels of the edge pixels that represent to video information along a second edge of the edges of the video frame;

wherein the third edge Alpha value corresponds to a third set of edge pixels of the edge pixels that represent to video information along a third edge of the edges of the video frame;

wherein the fourth edge Alpha value corresponds to a fourth set of edge pixels of the edge pixels that represent to video information along a fourth edge of the edges of the video frame;

wherein blending the edge Alpha values with the processed edge pixels comprises:

blending the first Alpha value with the processed first set of edge pixels;

blending the second Alpha value with the processed second set of edge pixels;

blending the third Alpha value with the processed third set of edge pixels; and blending the fourth Alpha value with the processed fourth set of edge pixels.

20. The method of claim 19, further comprising translating the video frame across the display frame in a specified direction of travel that comprises a nonzero horizontal component and a nonzero vertical component;

wherein the first edge and the second edge are parallel to each other, the third edge and the fourth edge are parallel to each other, and the first edge and the second edge are perpendicular to the third edge and the fourth edge;

the method further comprising:

determining the first Alpha value and the second Alpha value based on a value of the horizontal component of the specified direction of travel; and determining the third Alpha value and the fourth Alpha value based on a value of the vertical component of the specified direction of travel.

21. A system comprising:

a video buffer configured to store video information represented by video pixels and corresponding to a video frame to be translated across a display frame in a specified direction of travel at a specified rate of translation, wherein the video pixels comprise edge pixels representing video information along the edges of the video frame; and a frame buffer configured to store image information represented by image pixels; and a display pipe comprising at least one register configured to store edge Alpha values associated with the edge pixels, wherein the specified rate of translation corresponds to a number of pixels of movement in vertical and horizontal directions, and wherein the Alpha values are specified according to the number of pixels of movement, wherein the display pipe is configured to:

fetch the video pixels from the video buffer and fetch the image pixels from the frame buffer;

blend the edge Alpha values with the fetched edge pixels to produce blended edge pixels; and blend the fetched video pixels including the blended edge pixels with the fetched image pixels to produce blended pixels.

22. The system of claim 21, further comprising a display controller configured to receive the blended pixels and provide the blended pixels to be displayed on a display screen.

* * * * *

UNITED STATES PATENT AND TRADEMARK OFFICE
CERTIFICATE OF CORRECTION

PATENT NO. : 8,711,170 B2
APPLICATION NO. : 13/026559
DATED : April 29, 2014
INVENTOR(S) : Joseph P. Bratt et al.

Page 1 of 1

It is certified that error appears in the above-identified patent and that said Letters Patent is hereby corrected as shown below:

In the Claims:

Claim 19, Column 25, Line 34, please delete "represent to video" and substitute -- represent video --

Claim 19, Column 25, Lines 37 and 38, please delete ""represent to video" and substitute -- represent video --

Claim 19, Column 25, Lines 41 and 42, please delete "represent to video" and substitute -- represent video --

Signed and Sealed this
Nineteenth Day of August, 2014

Michelle K. Lee
*Deputy Director of the United States Patent and Trademark Office*